US006956302B2

(12) United States Patent
O'Farrell et al.

(10) Patent No.: US 6,956,302 B2
(45) Date of Patent: *Oct. 18, 2005

(54) REAR VISION SYSTEM FOR A VEHICLE EQUIPPED WITH A VEHICLE COMMUNICATION NETWORK

(75) Inventors: Desmond J. O'Farrell, Holland, MI (US); Roger L. Veldman, Holland, MI (US); Kenneth Schofield, Holland, MI (US)

(73) Assignee: Donnelly Corporation, Holland, MI (US)

(*) Notice: Subject to any disclaimer, the term of this patent is extended or adjusted under 35 U.S.C. 154(b) by 208 days.

This patent is subject to a terminal disclaimer.

(21) Appl. No.: 10/251,323

(22) Filed: Sep. 20, 2002

(65) Prior Publication Data

US 2003/0021001 A1 Jan. 30, 2003

Related U.S. Application Data

(63) Continuation of application No. 10/051,665, filed on Jan. 17, 2002, now Pat. No. 6,465,904, which is a continuation of application No. 09/747,576, filed on Dec. 22, 2000, now Pat. No. 6,340,850, which is a continuation of application No. 09/375,315, filed on Aug. 16, 1999, now Pat. No. 6,175,164, which is a continuation of application No. 09/138,919, filed on Aug. 24, 1998, now Pat. No. 5,959,367, which is a continuation of application No. 08/679,681, filed on Jul. 11, 1996, now Pat. No. 5,798,575.

(51) Int. Cl.[7] .................................................. G02B 5/08
(52) U.S. Cl. ......................... 307/9.1; 307/10.1; 701/49
(58) Field of Search .................................. 307/9.1, 10.1; 701/49

(56) References Cited

U.S. PATENT DOCUMENTS

| 3,680,951 A | 8/1972 | Jordan et al. |
| 4,451,887 A | 5/1984 | Harada et al. |

(Continued)

FOREIGN PATENT DOCUMENTS

| DE | 3722348 A | 10/1988 |
| DE | 4141504 | 8/1992 |
| EP | 0274848 A1 | 7/1988 |
| EP | 0294791 A2 | 12/1988 |
| EP | 0396089 A2 | 4/1990 |
| EP | 0433531 A1 | 6/1991 |
| FR | 2366958 | 5/1978 |
| GB | 2090017 A | 6/1982 |
| GB | 2315136 A | 1/1998 |
| WO | WO9605080 | 2/1996 |
| WO | WO9616838 A1 | 6/1996 |

OTHER PUBLICATIONS

Search Report from commonly owned European Application No. EP 98 65 0018, dated Jun. 15, 1998.

(Continued)

*Primary Examiner*—Albert W. Paladini
(74) *Attorney, Agent, or Firm*—Van Dyke, Gardner, Linn & Burkhart, LLP

(57) ABSTRACT

A vehicle rear vision system that is suitable for use in a vehicle equipped with a vehicle communication network includes an interior rearview mirror assembly and exterior rearview mirror assembly. The interior rearview mirror assembly includes an interior electro-optical reflective element and a first microprocessor-based control. The exterior rearview mirror assembly includes an exterior electro-optical reflective element and a second microprocessor-based control. Each microprocessor-based control controls a partial reflectance level of the respective electro-optic reflective element.

57 Claims, 6 Drawing Sheets

U.S. PATENT DOCUMENTS

| | | | |
|---|---|---|---|
| 4,698,571 A | 10/1987 | Mizuta et al. | |
| 4,707,788 A | 11/1987 | Tashiro et al. | |
| 4,793,690 A | 12/1988 | Gahan et al. | |
| 4,811,226 A | 3/1989 | Shinohara | |
| 4,871,953 A | 10/1989 | Anstee | |
| 4,883,974 A | 11/1989 | Tinder | |
| 4,886,960 A | 12/1989 | Molyneux et al. | |
| 4,917,477 A | 4/1990 | Bechtel et al. | |
| 4,936,671 A | 6/1990 | Kaspar | |
| 4,940,322 A | 7/1990 | Hamamoto et al. | |
| 5,019,759 A | 5/1991 | Takemura et al. | |
| 5,193,029 A | 3/1993 | Schofield et al. | |
| 5,196,965 A * | 3/1993 | Lang et al. | 359/841 |
| 5,424,898 A * | 6/1995 | Larson et al. | 361/101 |
| 5,479,155 A | 12/1995 | Zeinstra et al. | |
| 5,576,687 A | 11/1996 | Blank et al. | |
| 5,659,423 A | 8/1997 | Schierbeek et al. | 359/604 |
| 5,669,698 A | 9/1997 | Veldman et al. | 362/83.1 |
| 5,694,259 A * | 12/1997 | Brandin | 359/843 |
| 5,706,144 A | 1/1998 | Brandin | |
| 5,796,176 A | 8/1998 | Kramer et al. | |
| 5,798,575 A * | 8/1998 | O'Farrell et al. | 307/10.1 |
| 5,808,374 A | 9/1998 | Miller et al. | |
| 5,812,321 A | 9/1998 | Schierbeek et al. | 359/601 |
| 5,859,593 A | 1/1999 | Takemura et al. | |
| 5,883,605 A | 3/1999 | Knapp | 345/7 |
| 5,938,321 A | 8/1999 | Bos et al. | 362/494 |
| 5,939,796 A | 8/1999 | Tomassi et al. | |
| 5,959,367 A | 9/1999 | O'Farrell et al. | |
| 5,971,552 A | 10/1999 | O'Farrell et al. | 359/871 |
| 6,056,410 A | 5/2000 | Hoekstra et al. | 359/603 |
| 6,093,976 A | 7/2000 | Kramer et al. | |
| 6,099,131 A | 8/2000 | Fletcher et al. | 359/604 |
| 6,163,083 A | 12/2000 | Kramer et al. | 307/10.1 |
| 6,175,164 B1 | 1/2001 | O'Farrell et al. | |
| 6,291,905 B1 | 9/2001 | Drummond et al. | |
| 6,299,316 B1 | 10/2001 | Fletcher et al. | |
| 6,340,849 B1 | 1/2002 | Kramer et al. | |
| 6,340,850 B2 * | 1/2002 | O'Farrell et al. | 307/10.1 |

OTHER PUBLICATIONS

British Search Report from commonly owned European Application No. 9714581.7.

Industry Standard SAE J1708 Oct. 93 entitled "Serial Data Communications Between Microcomputer Systems in Heavy–Duty Vehicle Applications."

Article entitled "Electronics Create the Cybercar," *Design News*, Oct. 9, 1995.

International Search Report for International Application No. PCT/IE97/00019.

\* cited by examiner

REAR VISION SYSTEM FOR A VEHICLE EQUIPPED WITH A VEHICLE COMMUNICATION NETWORK

CROSS REFERENCE TO RELATED APPLICATIONS

This application is a continuation of application Ser. No. 10/051,665, filed on Jan. 17, 2002, now U.S. Pat. No. 6,465,904, which is a continuation of application Ser. No. 09/747,576, filed on Dec. 22, 2000, now U.S. Pat. No. 6,340,850, which is a continuation of application Ser. No. 09/375,315, filed on Aug. 16, 1999, now U.S. Pat. No. 6,175,164, which is a continuation of application Ser. No. 09/138,919, filed on Aug. 24, 1998, now U.S. Pat. No. 5,959,367, which is a continuation of application Ser. No. 08/679,681, filed on Jul. 11, 1996, now U.S. Pat. No. 5,798,575.

BACKGROUND OF THE INVENTION

This invention relates generally to vehicle rear vision systems for providing drivers with a view rearwardly of the vehicle. The invention may find application with optical rearview mirror assemblies and with solid-state-imaging arrays which capture images rearwardly of the vehicle for display by a display device.

With the advent of electro-optic mirror systems, in which an electro-optic reflectance element is driven to a partial reflectance level by a control module which is responsive to light levels in and around the vehicle, the vehicle rearview mirror has become an electronic assembly. Additional elements, such as motorized positioning devices, or actuators, for the mirror as well as mirror heaters, further contribute to the electrical functions performed by a mirror assembly. These functions require a one-way flow of control information to the mirror assembly. More recent features, such as multiple mirror position memory, require a two-way communication flow. The memory mirror assembly includes a position encoder which communicates the position of the mirror to a memory controller, typically located remotely from the mirror, such as at the vehicle dash. Other two-way communication flows are required by the addition of other features in the rearview mirror, such as keyless entry systems and the like. Other features are being added to vehicle mirrors, in general, and exterior mirrors, in particular, such as remote-actuated exterior vehicle security lights and signal lights, such as disclosed in commonly assigned International Application WO 97 21127 published Dec. 6, 1996, by Roger L. Veldman and Desmond J. O'Farrell for a VEHICLE GLOBAL POSITIONING SYSTEM NAVIGATIONAL AID; and blind spot detection systems, such as disclosed in U.S. patent application Ser. No. 60/013,941 filed Mar. 22, 1996, by Kenneth (NMI) Schofield for PROXIMITY DETECTION OF OBJECTS IN AND AROUND A VEHICLE, the disclosures of which are hereby incorporated herein by reference. Various other electronic functions, including heading sensors, better known as electronic compasses, intrusion detection and other security systems, antennas for intelligent vehicle highway systems (IVHS), as well as various transmitting and/or receiving antennas and/or systems including garage door openers, cellular telephones, radios, and the like are candidates for positioning within a mirror assembly.

Even with the moderate level of electrification of present vehicle mirror assemblies, it is not uncommon to require as many as 20 wire leads extending to the exterior mirror assemblies. This creates the problem of guiding the wire harness, including a connector, through the door panel. Additionally, the wiring harness adds weight to the vehicle and greatly increases the labor assembly time of the vehicle.

It has been proposed to replace the exterior mirror system of a vehicle with solid-state-imaging arrays which capture images rearwardly of the vehicle for display by a display device on or near the vehicle dash. One such system is disclosed in commonly assigned U.S. Pat. No. 5,670,935, issued to Kenneth (NMI) Schofield, Mark L. Larson and Keith J. Vadas for a REARVIEW VISION SYSTEM FOR VEHICLE INCLUDING PANORAMIC VIEW, the disclosure of which is hereby incorporated herein by reference. In such a rearview vision system, the solid-state-imaging device may be positioned in a housing in the approximate vicinity of present exterior rearview mirrors. As such, it can be expected that many of the electrical functions being placed in the housing of existing and proposed rearview mirror assemblies will be placed in the housing of the solid-state-imaging array in such system.

The increase in electronic functions being performed through the vehicle rearview assembly increasing involves communication with other portions of the vehicle. For example, global positioning system (GPS) functions and intelligent vehicle highway system (IVHS) functions may interact with other modules controlling vehicle navigation and the like. A headlamp control of the type disclosed in commonly assigned U.S. Pat. No. 5,715,093 issued to Kenneth L. Schierbeek and Niall R. Lynam, for an AUTOMATIC REARVIEW MIRROR SYSTEM WITH AUTOMATIC HEADLIGHT ACTIVATION, the disclosure of which is hereby incorporated herein by reference, utilizes common light sensors for activating the vehicle's headlights and establishing a partial reflectance level for the electro-optic mirror element. Such feature requires interaction with a headlamp module. Keyless entry systems may interact with the vehicle door locks, as well as interior lighting systems. Blind spot detection, intrusion detection, as well as numerous other functions, may involve interaction with various modules associated with the vehicle dash. Therefore, the vehicle mirror system is becoming more integrated with the rest of the vehicle electronics. A variety of other functions can be integrated into the interior or exterior mirror housing. For example, an electronically trainable garage door opener may be included, such as is described in U.S. Pat. No. 5,479,155 issued to Zeinstra et al.

In order to minimize hardware cost and overhead, as well as provide flexibility for expansion and technological advancements in vehicle electronics, vehicles are increasingly being equipped with serial data communication networks. Such networks include a bidirectional serial multiplex communication link over a bus among a plurality of control modules, each containing a microprocessor or microcomputer. Messages are transmitted asynchronously with priorities assigned to particular messages. For example, messages which require immediate access to the bus for safety reasons are provided top priority, with messages that require prompt action in order to prevent severe mechanical damage to the vehicle provided with a lesser priority but a higher priority than messages that affect the economical or efficient operation of the vehicle. The protocol of the system provides that higher priority messages are communicated without delay while lower priority messages await communication of higher priority messages. An industry standard for such serial data communication network is SAEJ1708 published October, 1993.

Functions associated with rearview mirror assemblies have traditionally not been included on the vehicle communication network. Almost all of the traditional mirror functions would be assigned lowest priority and would, therefore, have to await transmission of higher priority messages. Therefore, the traditional approach has been to provide dedicated hardware interconnects between devices located in the rearview mirror assemblies and external devices, such as power sources, switches, controls, and the like. One solution is proposed in U.S. Pat. No. 5,196,965 entitled REARVIEW UNIT FOR MOTOR VEHICLES in which a multiplex data system communicates information between a control unit and at least one exterior rearview mirror. While such system reduces the wire count extending through the door, or doors, to the exterior mirrors, it fails to fully integrate functions associated with the mirror assemblies with the remaining electronic assemblies of the vehicle.

Vehicle memory mirror systems include encoders for monitoring the position of each mirror element with respect to typically two axes and a positioning device, such as an actuator, for selectively positioninig the mirror element with respect to those axes. A control unit, typically located in and about the dash or in the door assembly, is capable of storing multiple data sets, each of which establishes a particular position of one or more of the vehicle's mirror elements. In this manner, when a different driver operates the vehicle, the data set associated with the driver is retrieved and utilized to position the mirror element, or elements, according to that data set. In order to do so, it is necessary to have information regarding the actual position of the mirror, which is provided by the position encoder, in order to enable the control to properly position the mirror element or elements. Such memory mirror systems further contribute to the wiring problem associated with rearview mirrors. The signals from the position encoder require additional wire leads, and all mirror assemblies included in the system must be wired back to a processor which is typically located in the dash. Furthermore, a user input device, such as a joystick, must be provided for use with each of the mirror elements of the memory mirror system in order to allow each driver to adjust each mirror element and store the position of that mirror element for that driver. This is a rather cumbersome process that can be distractive if performed while the vehicle is being operated.

SUMMARY OF THE INVENTION

The present invention is directed to a vehicle rear vision system having at least two rearview assemblies. Each of the rearview assemblies includes an image transfer device for transferring images rearwardly of the vehicle in order to be observable by a vehicle driver and a housing for the image transfer device. According to an aspect of the invention, a rear vision communication system provides communication between the rearview assemblies. Additionally, the rear vision communication system includes a communication link with the vehicle communication network. The rear vision communication system preferably includes control modules in each of the rearview assemblies which are interconnected by a communication channel. The image transfer device may be a mirror element, preferably an electro-optic mirror element and, most preferably, an electrochromic mirror element. Alternatively, the mirror element could be a chrome mirror or a standard silvered day/night prismatic mirror, especially for the interior rearview assembly. Alternatively, the image transfer device may be a solid-state-imaging array which captures images rearwardly of the vehicle for display by a display device.

According to a somewhat more specific aspect of the invention, a vehicle rear vision system includes an interior rearview mirror assembly and at least one exterior rearview mirror assembly, each including an electro-optic reflectance element and a housing for the reflectance element. The interior rearview mirror assembly includes a microprocessor-based control having a control channel to establish a partial reflectance level of the associated electro-optic reflectance element The exterior rearview mirror assembly includes a microprocessor-based control having a first control channel to establish a partial reflectance level of the associated electro-optic reflectance element, a second control channel to selectively activate a heater element in heat transfer association with the associated electro-optic reflectance element, a third control channel to operate a positioning device for the associated electro-optic reflection element, and a fourth control channel for receiving positional data from an encoder coupled with the associated electro-optic reflectance element. A communication channel is provided interconnecting the microprocessor-based controls, defining a rear vision communication network. At least one of the microprocessor-based controls includes a hardware node configured to interconnect with the vehicle communication network. That particular microprocessor-based control is programmed to format messages for the vehicle communication network and decode messages from the vehicle communication network.

Such a vehicle rear vision system, including a rear vision communication network, enhances the functionality of the vehicle rear vision system because the control commands for strictly local functions associated with the rear vision system are handled without requiring access to the vehicle communication network. In this manner, the rear vision system functions do not need to compete with higher priority functions of the vehicle communication network, such as automatic braking systems, air bag systems, and the like. This additionally reduces the load on the vehicle communication network by reducing the number of messages processed on that network. A vehicle rear vision system, according to the invention, provides connectivity between functions carried out by the vehicle rear vision system and other portions of the vehicle electronic system. This is provided by the communication link between the rear vision communication network and the vehicle communication network. This is accomplished without requiring a link between each rearview assembly control module and the vehicle communication network. Not only does this enhance the functionality of the vehicle rear vision system and the vehicle communication network, it reduces system hardware and software expense because most rearview assemblies require only a communication module and associated software. Only one of the rearview assemblies must be fully compatible with the vehicle communication network. A vehicle rear vision system, according to the invention, also significantly reduces the number of wire runs to each rearview assembly which reduces weight and cost while concurrently facilitating enhancement in reliability.

A vehicle rear vision system, according to yet an additional aspect of the invention, includes a plurality of rearview mirror assemblies, each including a reflective element, an actuator, which adjustably positions the reflective element about at least one axis, and a position encoder, which monitors the position of the reflective element with respect to that axis. A control is provided which is responsive to the encoder for each mirror assembly in order to supply positioning signals to the actuator for that mirror assembly. The positioning signals are a function of the position of the reflective element of that mirror assembly. The positioning signals are additionally a function of the position of the reflective element of at least one other of the mirror assemblies. Because each mirror reflective element is positioned by its actuator as a function not only of its own position, but the position of one or more of the other mirror reflective elements, a change in position of one reflective element results in a repositioning of all of the reflective elements controlled in this manner. This interactive dynamic memory mirror system is capable of defining a unique position, associated with the driver's eyes, which is targeted by all mirrors as a viewing point. As the viewing point changes, the position of the mirrors change in unison. Thus, this aspect of the invention provides an active closed-loop system which correlates the position of all mirror reflective elements. The user viewing point may be established by a conventional user input device, such as a joystick, such that manipulation of the joystick allows the user to simultaneously reposition all of the system mirror elements. This reduces the amount of manipulation which must be carried out by the driver to position the mirrors according to the viewing point of that driver. Additionally, a reduction in system hardware may be effected because only one joystick circuit is required. This aspect of the invention also comprehends the elimination of the joystick altogether by allowing the driver to position one mirror reflective element, such as the interior mirror reflective element, by hand with the control interactively repositioning the other mirror elements in response to the manual repositioning of the mirror reflective element. Alternatively, the location of the driver's eyes and, therefore, the optimum viewing point for each of the mirror elements, may be measured by machine vision techniques using solid-state-imaging arrays and image recognition software known in the art.

A dynamic interactive memory mirror system, according to this aspect of the invention, may additionally include a "zeroing" function in order to allow the driver to establish an initial positional relationship of the mirror elements that is more suitable to that driver. This would be particularly advantageous for drivers who utilize unconventional seating postures. The positional relationships of the mirror elements may be fixed to a more desirable viewing angle with respect to the vehicle than is typically utilized by most drivers. For example, it is known that most drivers align exterior rearview mirrors in order to capture at least a portion of the side of the vehicle in the image viewed in the mirror element by the driver. However, a mirror element orientation which extends angularly more outwardly of the vehicle may be more optimal for capturing objects in the drive's traditional blind spot. By pre-establishing positional relationships between the mirror elements, it may be possible to position the exterior mirrors in more appropriate positions with respect to the position of the interior mirror than that which would be typically set by the driver utilizing conventional norms. These and other objects, advantages, and features of this invention will become apparent upon review of the following specification in conjunction with the drawings.

DESCRIPTION OF THE PREFERRED EMBODIMENT

Figure 1:
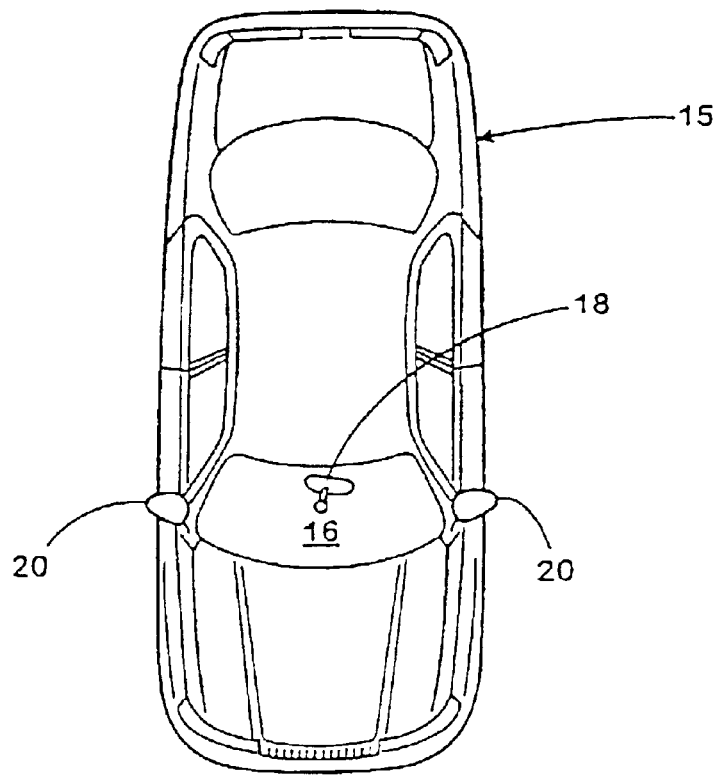
FIG. 1 is a top plan view of a vehicle incorporating the invention.

Referring now specifically to the drawings, and the illustrative embodiments depicted therein, a vehicle 15 is shown having a vehicle rear vision system 16, including an interior rearview assembly 18 and a pair of exterior rearview assemblies 20 (FIG. 1). In the illustrated embodiment, interior rearview assembly 18 is an interior rearview mirror which is preferably an electrically operated optical device and, most preferably, an electro-optic mirror, such as an electrochromic mirror, a liquid crystal mirror, or the like. Exterior rearview assemblies 20 may be exterior rearview mirror assemblies which are preferably electrically operated optical devices and, most preferably, electro-optic mirrors, such as an electrochromic mirror or a liquid crystal mirror, or the like, of the type disclosed in U.S. Pat. No. 5,371,659 entitled REMOTE ACTUATED EXTERIOR VEHICLE SECURITY LIGHT, the disclosure of which is hereby incorporated herein by reference. Alternatively, exterior rearview assemblies 20 and, possibly, interior rearview assembly 18 may be image transfer devices incorporating a solid-state-imaging array which captures images rearwardly of the vehicle for display by a display device (not shown), as disclosed in commonly assigned U.S. Pat. No. 5,670,935 issued to Kenneth (NMI) Schofield, Mark L. Larson, and Keith J. Vadas for a REARVIEW VISION SYSTEM FOR VEHICLE INCLUDING PANORAMIC VIEW, the disclosure of which is hereby incorporated herein by reference.

Figure 2:
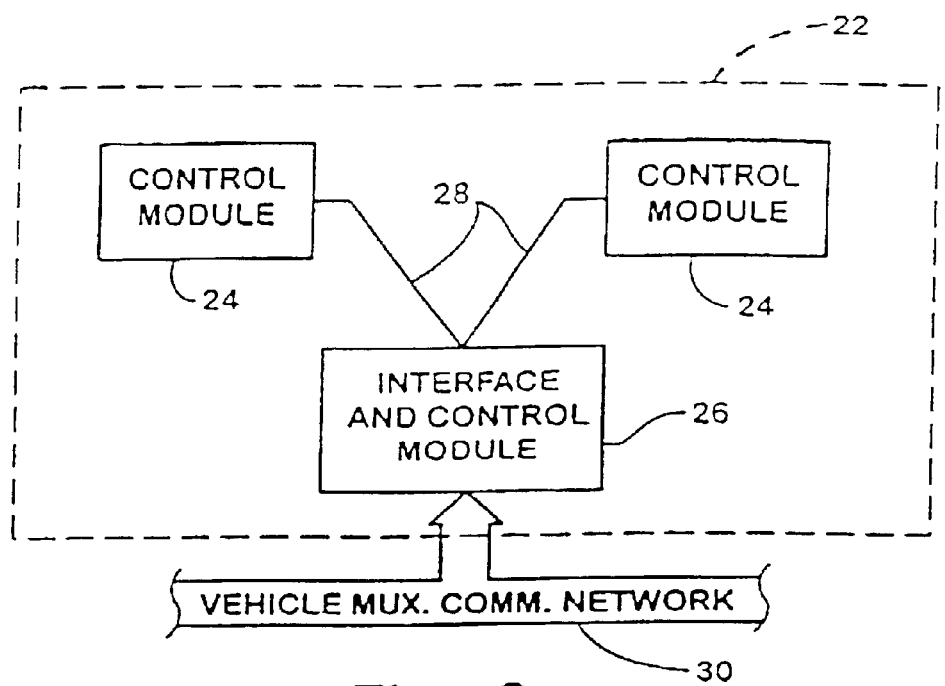
FIG. 2 is a block diagram of a rear vision communication system, according to the invention.

Vehicle rear vision system 16 includes a rear vision communication system 22 having one or more control modules 24, each of which is associated with interior rearview assembly 18 or an exterior rearview assembly 20 (FIG. 2). Rear vision communication system 22 further includes an interface and control module 26, which may be associated with interior rearview assembly 18, or an exterior rearview assembly 20, and which is interconnected with control modules 24 by a communication channel illustrated at 28. In addition to being linked with control module(s) 24, interface and control module 26 is linked with a vehicle-multiplexed communication network 30 provided with vehicle 15. Such vehicle-multiplexed communication network is typically proprietary to the manufacturer of the vehicle but is supplied according to industry standards, such as SAEJ1708 dated October, 1993, entitled SERIAL DATA COMMUNICATION BETWEEN MICROCOMPUTER SYSTEMS IN HEAVY-DUTY VEHICLE APPLICATIONS, the disclosure of which is hereby incorporated herein by reference.

Figure 6:
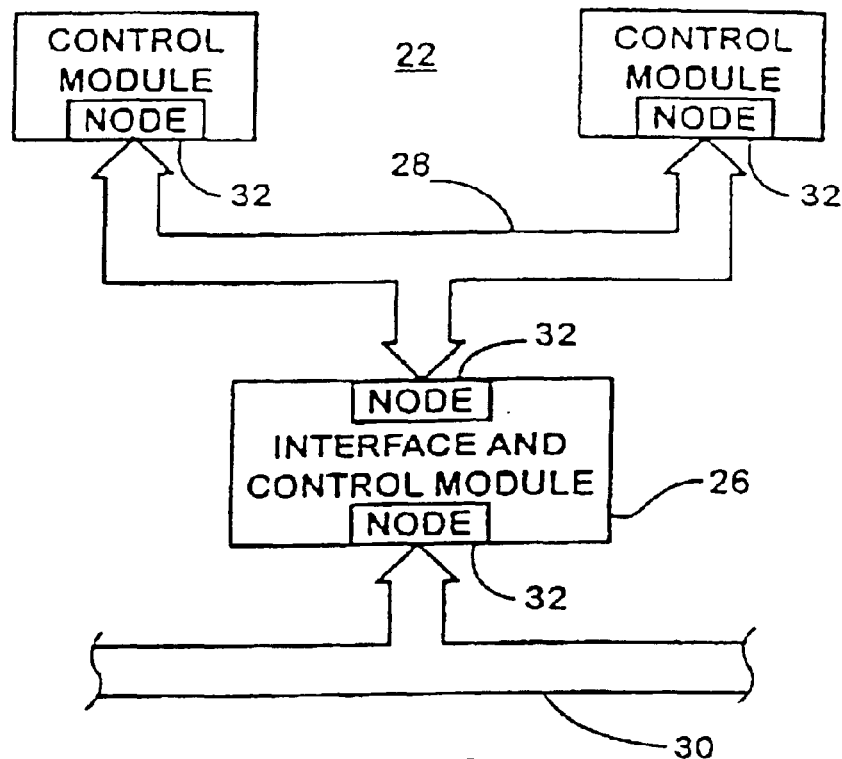
FIG. 6 is an alternative embodiment of a rear vision communication system.

In one embodiment, communication channel 23 at rear vision communication system 22 is a bidirectional, multiplex serial communication link, as illustrated in FIG. 6, that is supplied according to industry standards for serial data communications, such as SAEJ1708 issued October, 1993. As such, communication channel 23 preferably is defined by a pair of conductors including a redundant pair of conductors. Each control module 24 and interface and control module 26 includes a serial bus data node 32. Communication channel 28 is interfaced in hardware with each control module 24 and interface and control module 26 through the associated data node 32. Interface and control module 26 includes an additional node serial bus 32 for linking with the vehicle-multiplexed communication network 30. Nodes 32 are hardware-defined receiver or transceiver circuits complying with RS-485 protocol as defined in SAEJ1708 or other suitable communication protocol.

Alternatively, communication channel 28' could be defined by a fiber-optic cable having either a glass or plastic fiber with nodes which are capable of interfacing such fiber-optic system with control modules 24 and interface and control module 26. Alternatively, communication channel 28' could be a radio frequency (RF) link; in which case, the nodes would be capable of interfacing the RF link with control modules 24 and interface and control module 26. Alternatively, communication channel 28 may be defined by superimposing communication signals on the vehicle DC power grid, a technique generally referred to as carrier-current modulation, as well as other known techniques for transmitting data.

Figure 7:
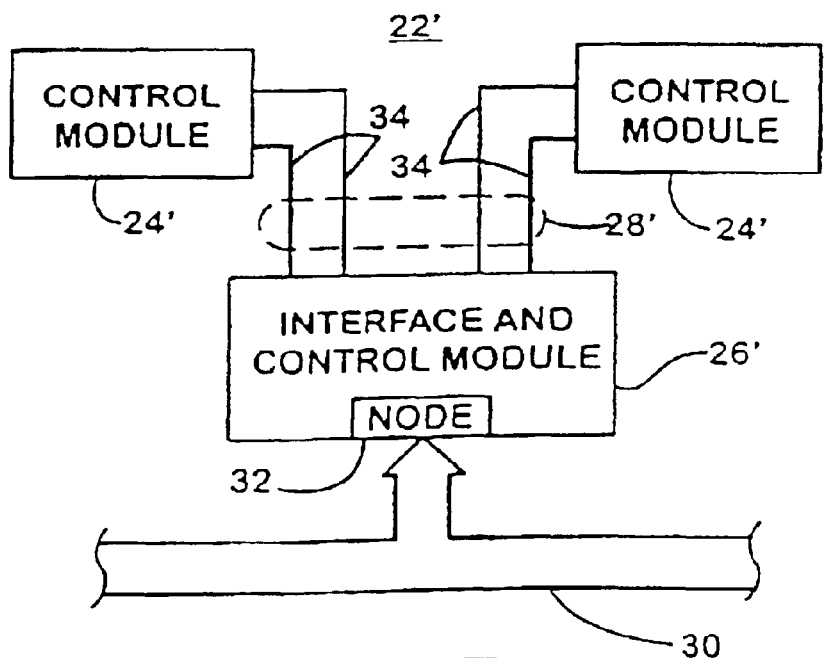
FIG. 7 is another alternative embodiment of a rear vision communication system.

An alternative rear vision communication system 22' is illustrated in FIG. 7. System 22' utilizes a communication channel 28' defined by a plurality of separate leads 34 providing interconnections between interface and control module 26' and each control module 24' without requiring a serial bus data node, although such node could be used to improve transmission over longer distances. Communication channel 28' could be a non-multiplexed system in which interface and control module 26' regulates communication with each control module 24'. As such, communication from one control module 24' to the other control module 24' would take place under the control of interface and control module 26'. However, interface and control module 26' includes a serial bus data node 32 linking the rear vision communication system 22' with vehicle-multiplexed communication network 30.

Rear vision communication system 22 can communicate between modules in the rear vision system according to any protocol that is suited to the application, as would be readily apparent to those skilled in the art. Preferably, rear vision communication system 22 would comply with industry standards, such as SAE J1708 (OCT93), which is the typical standard utilized for vehicle-multiplexed communication network 30. Because it is a separate and distinct communication system, rear vision communication system 22 can utilize its own message definition and priority which can be consistent irrespective of the proprietary protocol utilized with the vehicle-multiplexed communication network to which the rear vision communication system is linked. In this manner, only the software of the interface and control module 26 must be adapted to the particular proprietary protocol of the vehicle. The remaining hardware and software of rear vision communication system 22 would be uniform irrespective of the particular vehicle. Rear vision communication system 22 may use other network configurations such as the Novell 10-Base-T hub-and-spoke architecture, or the like.

Figure 3:
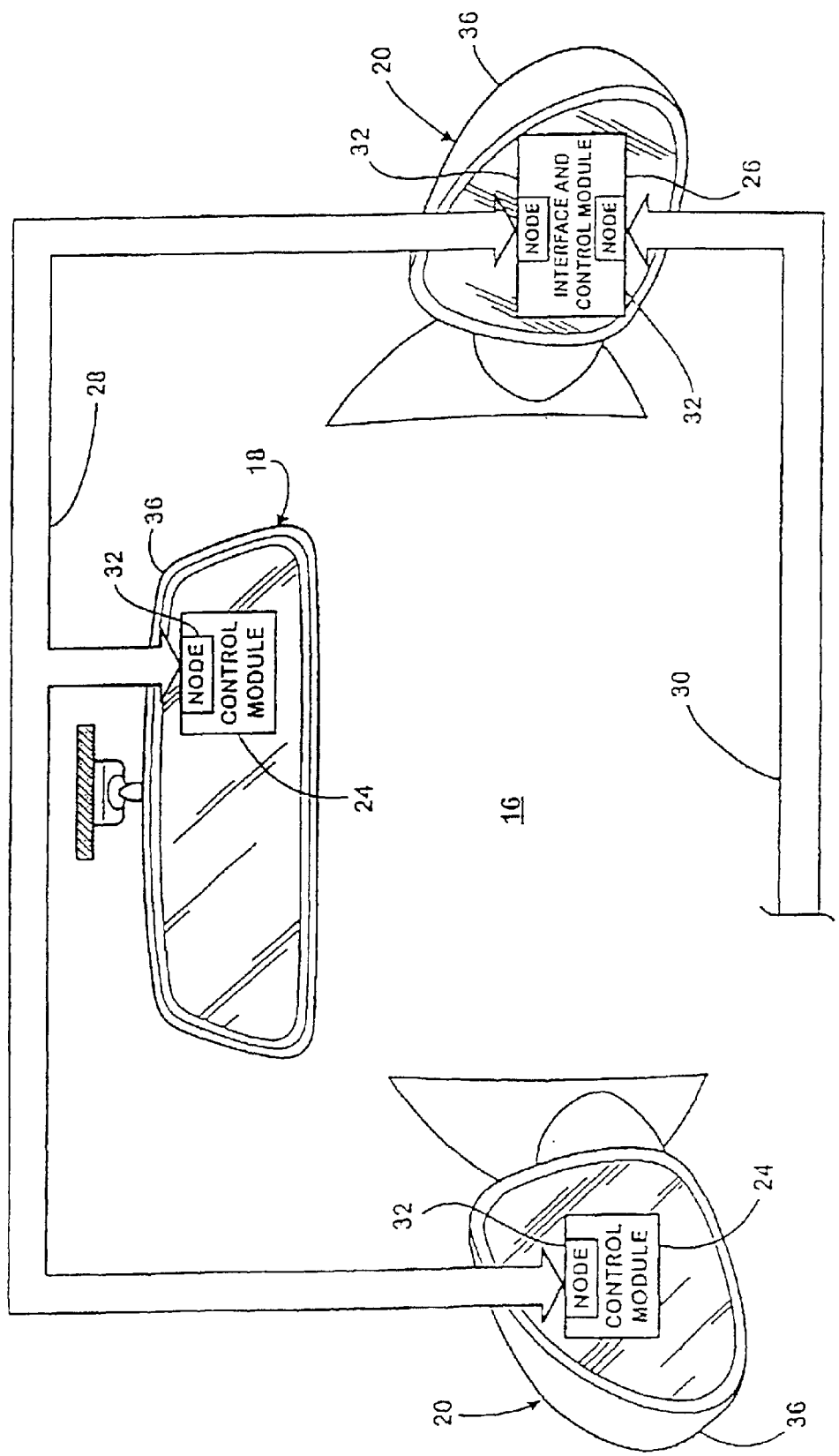
FIG. 3 is a first embodiment of a vehicle rear vision system incorporating the invention.
Figure 4:
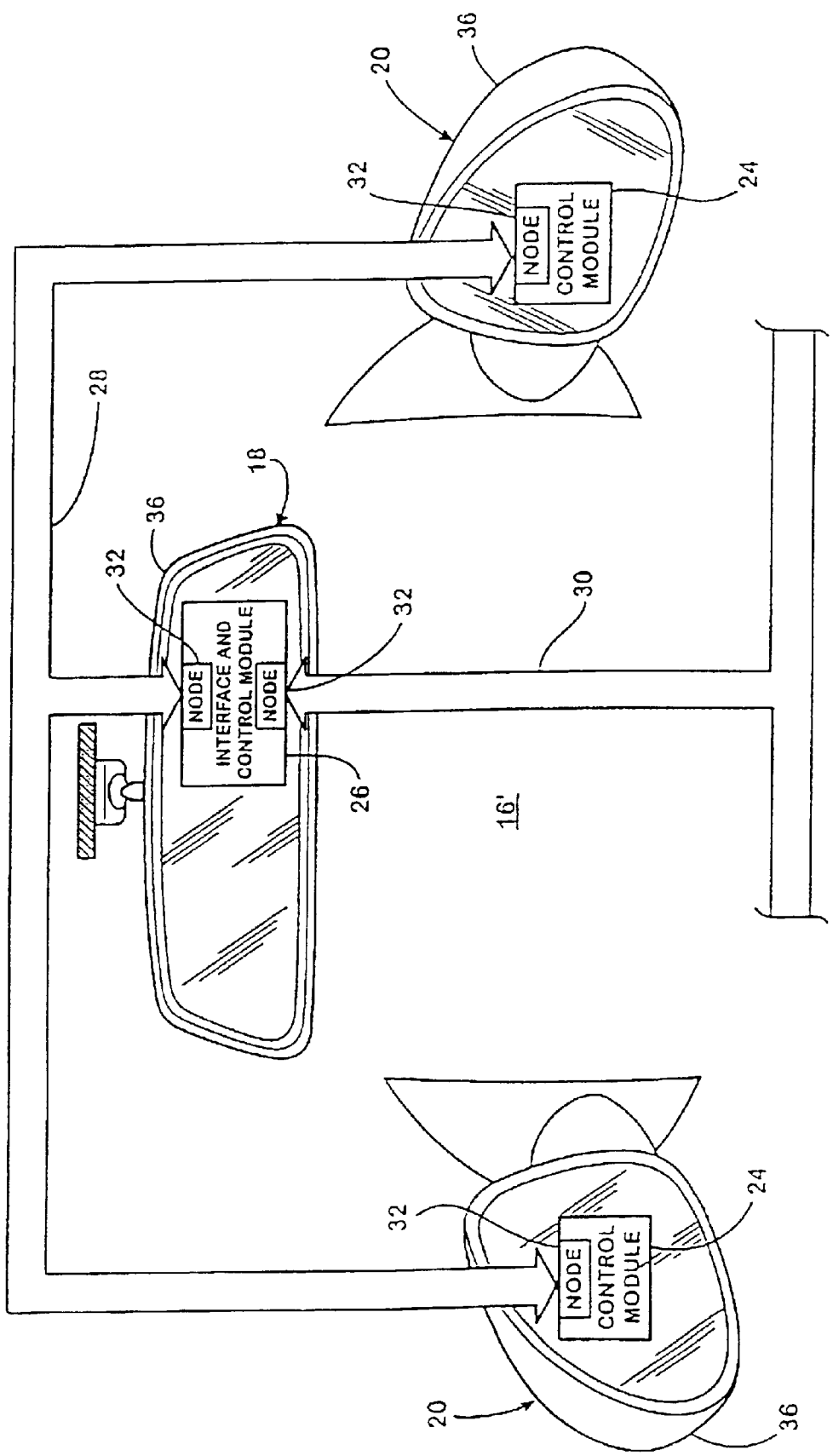
FIG. 4 is an alternative embodiment of a vehicle rear vision system.

As can be seen in FIGS. 3 and 4, each control module 24 or interface and control module 26 is positioned within interior rearview assembly 18 or one of exterior rearview assemblies 20. In particular, the respective control module or interface and control module is positioned within a housing 36 of the respective rearview assembly. In the embodiment illustrated in FIG. 3, vehicle vision system 16 incorporates interface and control module 26 in an exterior rearview assembly 20. In this manner, the link with vehicle-multiplexed communication network 30 is made at the corresponding exterior rearview assembly 20. In an alternative embodiment illustrated in FIG. 4, vehicle rear vision 16' incorporates interface and control module 26 within the housing 36 of interior rearview assembly 18. In this manner, the link with vehicle-multiplexed communication network 30 is made at the interior rearview assembly for vehicle rear vision system 16'.

Figure 5:
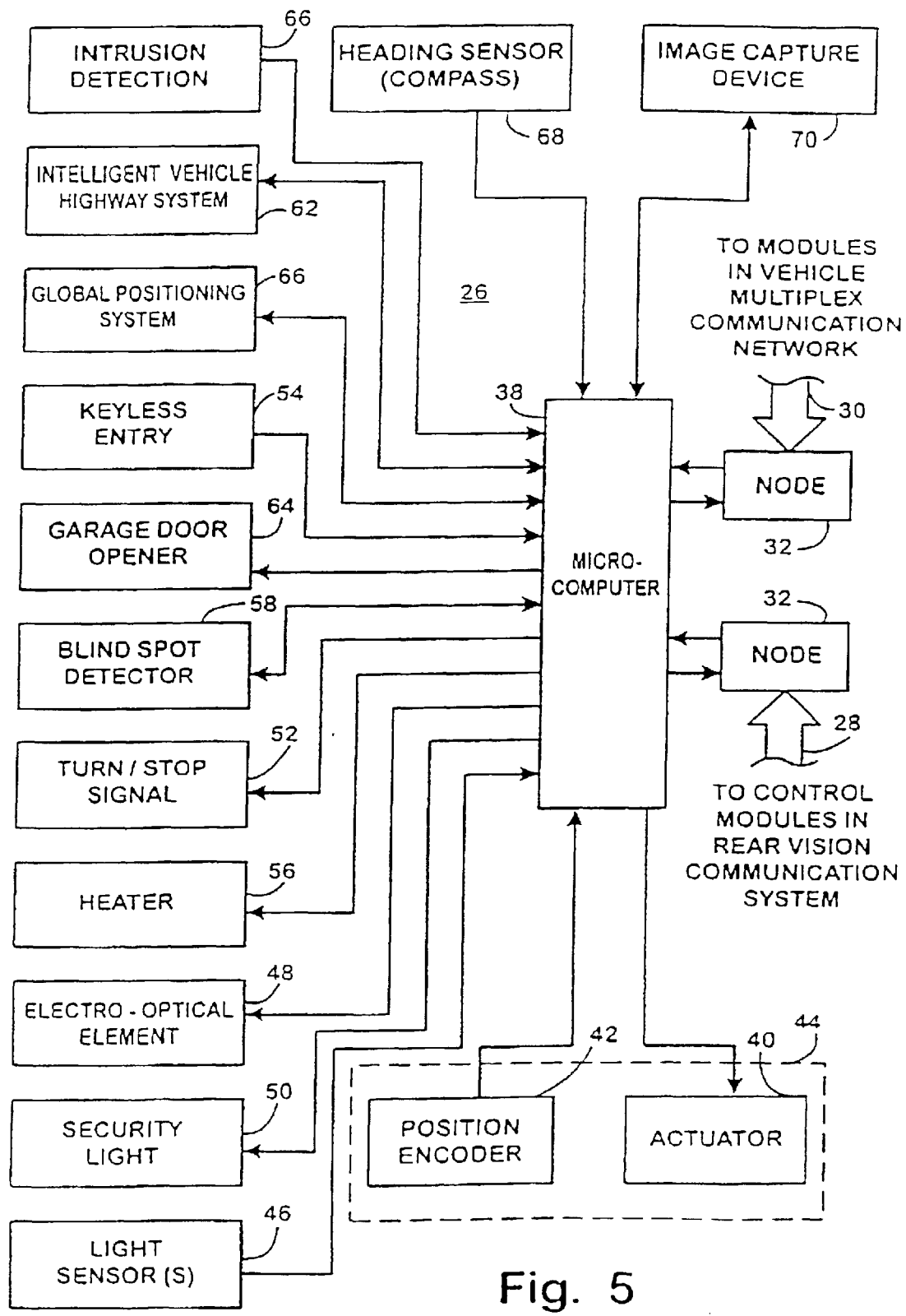
FIG. 5 is a block diagram of a control module.

A representative interface and control module 26 is illustrated in FIG. 5. Interface and control module 26 includes a microcomputer 38 and a pair of serial bus data nodes 32. One node 32 is connected with communication channel 28, and the other is connected with vehicle-multiplexed communication network 30. Microcomputer 38 is interconnected with one or more input and/or output devices, as illustrated in FIG. 5. It should be understood that the particular input and/or output devices interconnected with microcomputer 33 may vary depending upon the particular features provided with vehicle 15 and the location of interface and control module 26. If interface and control module 26 is positioned within interior rearview assembly 18, the input and/or output devices would likely be different than if interface and control module 26 is positioned within the housing of exterior rearview assembly 20. It should additionally be understood that a control module 24 is similar to interface and control module 26, except that serial bus data node 32 extending to the vehicle-multiplexed communication network would not be provided for the control module.

By reference to FIG. 5, interface and control module 26 may provide an output to an actuator 40 and receive an input from a position encoder 42, both of which are mechanically coupled with a mirror reflectance element, generally illustrated at 44. In this manner, microcomputer 38 provides outputs to operate actuator 40 and receives positional data from encoder 42 as an input. Interface and control module 26 may additionally receive an input from one or more light sensors 46. The level of light to which light sensors 46 are exposed may be utilized by microcomputer 38 in order to provide an output to an electro-optic element 48 in order to establish the partial reflectance level of the electro-optic element and/or may be utilized to provide an output over vehicle-multiplexed communication bus 30 to a headlight control module (not shown) in order to activate the vehicle headlights in low light conditions and deactivate the vehicle headlights in high light conditions, both functions are disclosed in commonly assigned U.S. Pat. No. 5,715,093 issued to Kenneth L. Schierbeek and Niall R. Lynam for an AUTOMATIC REARVIEW MIRROR SYSTEM WITH AUTOMATIC HEADLIGHT ACTIVATION, the disclosure of which is hereby incorporated herein by reference.

Microcomputer 38 may additionally provide an output in order to actuate a security light 50 and/or a turn and/or stop signal 52 of the type disclosed in commonly assigned U.S. Pat. No. 5,371,659 entitled REMOTE ACTUATED EXTERIOR VEHICLE SECURITY LIGHT, the disclosure of which is hereby incorporated herein by reference. The signal to actuate security light 50 may be received as an input from a keyless entry antenna 54. Instead of merely a keyless entry antenna, device 54 may be an entire keyless entry receiver system including antenna and receiver. Microcomputer 38 may additionally provide an output to a heater 56 which is in heat transfer association with reflective element 44. Heater 56 may be of the type disclosed in commonly assigned U.S. Pat. No. 5,446,576 for an ELECTROCHROMIC MIRROR FOR VEHICLE WITH ILLUMINATION CONTROL, the disclosure of which is hereby incorporated herein by reference.

The previously described functions performed by microcomputer 38 involve primarily mirror-related functions or one-way communications provided from an input device or to an output device. As can be seen, for example, with respect to control of the activation state of the vehicle headlights, the input provided to microcomputer 38 may be communicated over the vehicle-multiplexed communication bus 30 to other modules on the vehicle bus. Likewise, communication with other modules on the vehicle bus may be two-way communication. For example, a blind spot detector 58 may provide inputs to, and receive outputs from, microcomputer 38 which are then communicated through vehicle communication bus 30 to other vehicle control modules. Interface and control module 26 may additionally include a global positioning system (GPS) antenna 60, or entire GPS receiver assembly including the receiver electronics associated with the antenna, which provides an input to, and receives an output from, microcomputer 38 as disclosed in commonly assigned International Application WO 97/21127 published Dec. 6, 1996, by Roger L. Veldman and Desmond J. O'Farrell for a VEHICLE GLOBAL POSITIONING SYSTEM NAVIGATIONAL AID, the disclosure of which is hereby incorporated herein by reference. In a similar fashion, interface and control module 26 may include two-way communication with an intelligent vehicle highway system (IVHS) transceiver 62 in order to receive IVHS input data, and to transmit IVHS output data, as is known in the art. Interface and control module 26 may include an output to a garage door opener antenna 64, or system including transmitter electronic components. Interface and control module 26 may include an intrusion detection module 66 and a compass sensor module 68 of the type disclosed in commonly assigned U.S. Pat. No. 5,255,442 entitled VEHICLE COMPASS WITH ELECTRONIC SENSOR, the disclosure of which is hereby incorporated herein by reference.

Interface and control module 26 may be used in combination with a solid-state image capture device 70 of the type disclosed in the PCT International Publication No. WO 96/38319 published 5 Dec. 1996 by Kenneth (NMI) Schofield, Mark L. Larson, and Keith J. Vadas for a REARVIEW VISION SYSTEM FOR VEHICLE INCLUDING PANORAMIC VIEW, the disclosure of which is hereby incorporated herein by reference. Microcomputer 38 may process image data captured by image capture device 70 providing a direct communication channel (not shown) to a display device located in and around the vehicle dash. Alternatively, microcomputer 38 may provide data over vehicle-multiplexed communication bus 30 or rear vision assembly communication channel 28 indicative of changes in particular image pixel data, as disclosed in the aforementioned patent application, in order to reduce the amount of data transmission to the display device.

Figure 8:
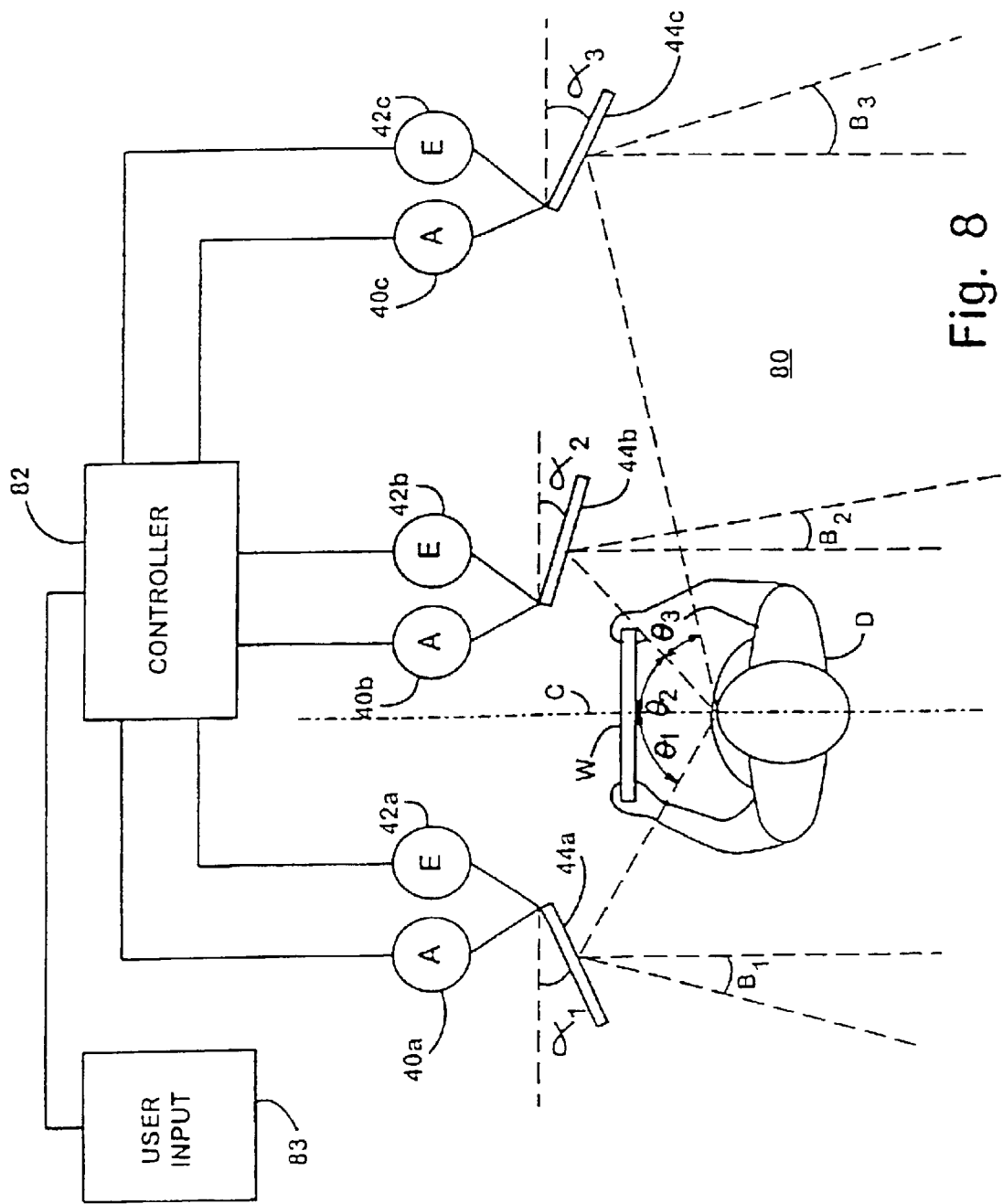
FIG. 8 is a top plan view of an interactive mirror system, according to the invention.

An interactive, dynamically adjustable mirror system 80 is provided in which actuator 40*a* and position encoders 42*a* and 42*c* for reflective elements 44*a* and 44*c* of driver-side exterior rearview assembly and passenger-side rearview assembly 20 are provided to a controller 82 (FIG. 8). A position actuator 40*b* and encoder 42*b* may additionally be provided with the reflective element 44*b* of the interior rearview assembly 18 and interconnected with controller 82 (FIG. 8). If it is assumed that the driver's eyes are laterally centered on an axis C extending through the center of the steering wheel W, an angle $\theta_1$ is formed between the eyes of the driver and the driver-side mirror element 44*a*, an angle $\theta_2$ is formed between the driver's eyes and the interior reflective element 44*b*, and an angle $\theta_3$ is formed between the driver's eyes and the passenger-side exterior reflective element 44*c*. Assuming that angle $\beta_1$ between the vehicle's longitudinal axis and the field of view observed through the driver-side exterior reflective element is to remain constant, a change in angle $\theta_1$ requires a corresponding change in angle $\alpha_1$, which is the orientation of the driver-side exterior reflective element 44*a* with respect to a vertical axis. Likewise, a change in angle $\theta_2$ will require a change in the angle $\alpha_2$ of interior reflective element 44*b* in order to maintain field of view angle $\beta_2$ constant, and a change in angle $\theta_3$ will require a change in the angle of the reflective element 44*c* of the passenger-side exterior mirror in order to maintain the corresponding field of view $\beta_3$ constant. Utilizing known geometric relationships, a change in any one of the angles $\theta_1$, $\theta_2$, or $\theta_3$ would provide sufficient information to determine corresponding changes in the value of the other of the angles $\theta_1$, $\theta_2$, and $\theta_3$. Likewise, utilizing known geometric relationships, corresponding changes in angles $\alpha_1$, $\alpha_2$, and $\alpha_3$ required to compensate for changes in angles $\theta_1$, $\theta_2$, and $\theta_3$ while keeping the fields of view $\beta_1$, $\beta_2$, and $\beta_3$ constant can be determined. Accordingly, if a change is made in any one of the positional angles $\alpha_1$, $\alpha_2$, and $\alpha_3$, then the necessary changes to the other of the angles $\alpha_1$, $\alpha_2$, and $\alpha_3$ required to re-establish the desired field of view angles $\beta_1$, $\beta_2$, and $\beta_3$, can be determined. In a similar manner, the positional location of reflective elements 44*a*–44*c* about a horizontal axis may be geometrically related to the vertical location of the driver's eyes such that a change, for example, from one driver to another, or a change in the driver's seat elevation, would provide known interrelationships between the relative positions of the reflective elements with respect to a horizontal axis. This principle is utilized in order to provide an interactive closed-loop system which correlates the position of all mirror reflective elements 44*a*–44*c* and establishes a particular positional relationship between the mirrors. By providing a user input 83 for the driver to adjust the position of one reflective element 44*a*–44*c*, interactive mirror system 80 readjusts the positions of the other reflective elements 44*a*–44*c*, preferably about both vertical and horizontal aces, or other pairs of axes, in order to compensate for changes in the driver's viewing point.

Changes in the position of the driver's eyes can be determined in various ways. One manner would be to provide a joystick for user input selection device 83 to allow the driver to manually adjust the position of one of the reflective elements. Controller 82 would respond to the change in position of one of the reflective elements 44*a*–44*c* by providing suitable adjustments in the other reflective elements 44*a*–44*c*. Another manner would be to allow the driver to manually position one of the mirror elements, such as the reflective element associated with the interior mirror, while monitoring movement of that mirror through its associated position encoder 42. The resulting change in the position of the manually adjustable mirror would be processed by controller 82 in order to provide commensurate changes in the position of the exterior mirror reflective elements. Another technique for determining changes in the driver's eye location would be to utilize a machine vision system in order to capture the image of the driver's eyes and determine changes in such position. Such systems are known in the art.

Interactive mirror system 80 may additionally include a zero reset function in order to allow the driver to adjust the relative position of any of the reflective elements for a given eye position. The system may further include a lockout feature in order to allow the operator to lock out the interactive function in order to allow a normal memory function to occur, as is known in the art. The system may additionally provide an override feature to allow the mirror elements in the system to be independently adjusted.

An interactive mirror system, according to the invention, provides a unique set of mirror positions for each driver that allows the optimum field of view to be provided for that driver to thereby minimize blind spots and provide the driver with the optimal information on trailing vehicles or when backing the vehicle. In this manner, an interactive mirror system, according to the invention, not only reduces the amount of distraction to the driver for repositioning the mirrors, but also improves the performance of the mirror system by overcoming preconceived notions of drivers as to an optimum position of the mirrors.

Advantageously, an interactive mirror system 80 may utilize a rear vision communication system 22 in order to effectively and efficiently communicate control functions among the interior rearview assembly 18 and the two exterior rearview assemblies 20.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A vehicle rear vision system suitable for use in a vehicle equipped with a vehicle communication network, said system comprising:
   an interior rearview mirror assembly and an exterior rearview mirror assembly;
   said interior rearview mirror assembly including an interior electro-optical reflectance element and a first microprocessor-based control;
   said exterior rearview mirror assembly including an exterior electro-optical reflectance element and a second microprocessor-based control;
   said first microprocessor-based control controlling a partial reflectance level of said interior electro-optical reflectance element;
   said second microprocessor-based control controlling a partial reflectance level of said exterior electro-optical reflectance element; and
   said first microprocessor-based control of said interior rearview assembly formatting messages for the vehicle communication network and said second microprocessor-based control of said exterior mirror assembly decoding messages from the vehicle communication network.

2. The vehicle rear vision system of claim 1, said second microprocessor-based control operable to at least one chosen from (i) selectively activating a heater element in heat transfer association with said exterior electro-optical reflectance element, (ii) operating a positioning device for said exterior electro-optical reflectance element, (iii) actuating a security light, (iv) actuating a turn signal, and (v) actuating a stop signal.

3. The vehicle rear vision system of claim 2, wherein said first microprocessor-based control includes a node for linking with the vehicle communication network.

4. The vehicle rear vision system of claim 3, wherein said node for linking with the vehicle communication network comprises a serial data node.

5. The vehicle rear vision system of claim 1, wherein said first microprocessor-based control includes a node for linking with the vehicle communication network.

6. The vehicle rear vision system of claim 5, wherein said second microprocessor-based control includes another node for linking with the vehicle communication network.

7. The vehicle rear vision system of claim 6, wherein said another node for linking with the vehicle communication network comprises a serial data node.

8. The vehicle rear vision system of claim 1, wherein said first microprocessor-based control receives an input from at least one light sensor.

9. The vehicle rear vision system of claim 8, wherein said first microprocessor-based control provides an output in response to said input in order to activate or deactivate a vehicle headlight.

10. The vehicle rear vision system of claim 9, wherein said first microprocessor-based control provides said output over the vehicle communication network.

11. The vehicle rear vision system of claim 1, wherein said first microprocessor-based control one light sensor and wherein said first microprocessor-based control controls a partial reflectance level of said interior electro-optic reflectance element in response to said input.

12. The vehicle rear vision system of claim 11, wherein said electro-optical reflectance element comprises an electrochromic reflectance element.

13. The vehicle rear vision system of claim 1, wherein said second microprocessor-based control receives an input from at least one light sensor.

14. The vehicle rear vision system of claim 13, wherein said second microprocessor-based control controls a partial reflectance level of said exterior electro-optic reflectance element in response to said input.

15. The vehicle rear vision system of claim 1, wherein said exterior electro-optic reflectance element comprises an electrochromic mirror element.

16. The vehicle rear vision system of claim 1, wherein said first microprocessor-based control receives input from or provides output to at least one chosen from an image capture device, an intelligent highway system, an antenna, a global positioning system, a keyless entry system, a garage door opener, a blind-spot detector, and a heading sensor.

17. The vehicle rear vision system of claim 1, wherein the vehicle communication network comprises a vehicle-multiplexed communication bus.

18. The vehicle rear vision system of claim 1, wherein said system includes another exterior and wherein said another exterior minor assembly includes another exterior electro-optical reflectance element and a third microprocessor-based control.

19. The vehicle rear vision system of claim 18 wherein said third microprocessor-based control decodes messages from the vehicle communication network.

20. A vehicle rear vision system suitable for use in a vehicle equipped with a vehicle communication network, said system comprising:
   an interior rearview minor assembly and an exterior rearview mirror assembly;
   said interior rearview mirror assembly including an interior electro-optical reflectance element and a first microprocessor-based control;
   said exterior rearview mirror assembly including an exterior electro-optical reflectance element and a second microprocessor-based control;
   said first microprocessor-based control controlling a partial reflectance level of said interior electro-optical reflectance element;
   said second microprocessor-based control controlling a partial reflectance level of said exterior electro-optical reflectance element; and
   said first microprocessor-based control of said interior rearview assembly linking via a serial bus with the vehicle communication network.

21. The vehicle rear vision system of claim 20, said second microprocessor-based control operable to at least one chosen from (i) selectively activating a heater element in heat transfer association with said exterior electro-optical reflectance element, (ii) operating a positioning device for said exterior electro-optical reflectance element, (iii) actuating a security light, (iv) actuating a turn signal, and (v) actuating a stop signal.

22. The vehicle rear vision system of claim 20, said first microprocessor-based control of said interior rearview assembly formatting messages for the vehicle communication network and said second microprocessor-based control of said exterior minor assembly decoding messages from the vehicle communication network.

23. The vehicle rear vision system of claim 20, first microprocessor-based control of said interior rearview assembly formatting messages for the vehicle communication network.

24. The vehicle rear vision system of claim 20, said second microprocessor-based control of said exterior mirror assembly decoding messages from the vehicle communication network.

25. The vehicle rear vision system of claim 20, said second microprocessor-based control of said exterior rearview assembly linking via a serial bus with the vehicle communication network.

26. The vehicle rear vision system of claim 25, wherein said exterior electro-optical reflectance element comprises an electrochromic reflectance element.

27. The vehicle rear vision system of claim 20, wherein said first microprocessor-based control receives an input from at least one light sensor.

28. The vehicle rear vision system of claim 27, wherein said first microprocessor-based control provides an output in response to said input in order to activate or deactivate a vehicle headlight.

29. The vehicle rear vision system of claim 28, said first microprocessor-based control provides said output over the vehicle communication network.

30. The vehicle rear vision system of claim 20, wherein said first microprocessor-based control receives an input from at least one light sensor and wherein said first microprocessor-based control controls the partial reflectance level of said interior electro-optic reflectance element in response to said input.

31. The vehicle rear vision system of claim 30, wherein said interior electro-optical reflectance element comprises an electrochromic reflectance element.

32. The vehicle rear vision system of claim 20, wherein said second microprocessor-based control receives an input from at least one light sensor.

33. The vehicle rear vision system of claim 32, wherein said second microprocessor-based control controls the partial reflectance level of said exterior electro-optic reflectance element in response to said input.

34. The vehicle rear vision system of claim 20, wherein said exterior electro-optic reflectance element comprises an electrochromic mirror element.

35. The vehicle rear vision system of claim 20, wherein said first microprocessor-based control receives input from or provides output to at least one chosen from an image capture device, an intelligent highway system, an antenna, a global positioning system, a keyless entry system, a garage door opener, a blind-spot detector, and a heading sensor.

36. The vehicle rear vision system of claim 20, wherein the vehicle communication network comprises a vehicle-multiplexed communication bus.

37. The vehicle rear vision system of claim 20, wherein said system includes another exterior rearview mirror assembly, and wherein said another exterior mirror assembly includes another exterior electro-optical reflectance element and a third microprocessor-based control.

38. The vehicle rear vision system of claim 37 wherein said third microprocessor-based control decodes messages from the vehicle communication network.

39. A vehicle rear vision system suitable for use in a vehicle equipped with a vehicle communication network, said system comprising:

an interior rearview mirror assembly and an exterior rearview mirror assembly;

said interior rearview mirror assembly including an interior electrochromic reflectance element and a first microprocessor-based control;

said exterior rearview mirror assembly including an exterior electrochromic reflectance element and a second microprocessor-based control;

said first microprocessor-based control controlling a partial reflectance level of said interior electrochromic reflectance element;

said second microprocessor-based control controlling a partial reflectance level of said exterior electrochromic reflectance element;

said first microprocessor-based control of said interior rearview assembly linking via a serial bus with the vehicle communication network; and said first microprocessor-based control of said interior rearview assembly formatting messages for the vehicle communication network.

40. The vehicle rear vision system of claim 39, said second microprocessor-based control operable to at least one chosen from (i) selectively activating a heater element in heat transfer association with said exterior electrochromic reflectance element, (ii) operating a positioning device for said exterior electrochromic reflectance element, (iii) actuating a security light, (iv) actuating a turn signal, and (v) actuating a stop signal.

41. The vehicle rear vision system of claim 39, said second microprocessor-based control of said exterior mirror assembly decoding messages from the vehicle communication network.

42. The vehicle rear vision system of claim 39, said first microprocessor-based control of said interior rearview assembly linking bi-directionally to the vehicle communication network.

43. The vehicle rear vision system of claim 42, said second microprocessor-based control of said exterior mirror assembly decoding messages from the vehicle communication network.

44. The vehicle rear vision system of claim 39, said second microprocessor-based control of said exterior rearview assembly linking via a serial bus with the vehicle communication network.

45. The vehicle rear vision system of claim 44, said second microprocessor-based control of said exterior mirror assembly decoding messages from the vehicle communication network.

46. The vehicle rear vision system of claim 39, wherein said first microprocessor-based control receives an input from at least one light sensor.

47. The vehicle rear vision system of claim 46, wherein said first microprocessor-based control provides an output in response to said input in order to activate or deactivate a vehicle headlight.

48. The vehicle rear vision system of claim 47, wherein said first microprocessor-based control provides said output over the vehicle communication network.

49. The vehicle rear vision system of claim 39, wherein said first microprocessor-based control receives an input from at least one light sensor and wherein said first microprocessor-based control controls the partial reflectance level of said interior electrochromic reflectance element in response to said input.

50. The vehicle rear vision system of claim 49, wherein said second microprocessor-based control of said exterior mirror assembly decodes messages from the vehicle communication network.

51. The vehicle rear vision system of claim 39, wherein said second microprocessor-based control receives an input from at least one light sensor.

52. The vehicle rear vision system of claim 51, wherein said second microprocessor-based control controls the partial reflectance level of said exterior electrochromic reflectance element in response to said input.

53. The vehicle rear vision system of claim 52, said second microprocessor-based control of said exterior mirror assembly decoding messages from the vehicle communication network.

54. The vehicle rear vision system of claim 39, said first microprocessor-based control receives input from or provides output to at least one of arm image capture device, an intelligent highway system, an antenna, a global positioning system, a keyless entry system, a garage door opener, a blind-spot detector, and a heading sensor.

55. The vehicle rear vision system of claim 39, wherein the vehicle communication network comprises a vehicle-multiplexed communication bus.

56. The vehicle rear vision system of claim 39, wherein said system includes another exterior rearview mirror assembly, and wherein said another exterior mirror assembly includes another exterior electrochromic reflectance element and a third microprocessor-based control.

57. The vehicle rear vision system of claim 56 wherein said third microprocessor-based control decodes messages from the vehicle communication network.

* * * * *

UNITED STATES PATENT AND TRADEMARK OFFICE
CERTIFICATE OF CORRECTION

PATENT NO. : 6,956,302 B2
APPLICATION NO. : 10/251323
DATED : September 20, 2002
INVENTOR(S) : Desmond J. O'Farrell, Roger L. Veldman and Kenneth Shofield It is certified that error appears in the above-identified patent and that said Letters Patent is hereby corrected as shown below:

Column 3:
Line 20, "positioninig" should be --positioning--.

Column 5:
Line 47, "drive's" should be --driver's--.

Column 6:
Line 57, "23 at" should be --28 of--.
Line 62 "23" should be --28--.

Column 8:
Line 16, "33" should be --38--.

Column 10:
Line 38, "aces" should be --axes--

Column 12:
Line 15, Claim 11, Insert --receives an input from at least-- after "control".
Line 42, Claim 18, Insert --rearview mirror assembly-- after "exterior".
Line 43, Claim 18, "minor" should be --mirror--.
Line 53, Claim 20, "minor" should be --mirror--.

Column 13:
Line 13, Claim 22, "minor" should be --mirror--.
Line 15, Claim 23, Insert --said-- after "claim 20,".
Line 37, Claim 29, Insert --wherein-- after "claim 28,".

UNITED STATES PATENT AND TRADEMARK OFFICE
CERTIFICATE OF CORRECTION

| | |
|---|---|
| PATENT NO. | : 6,956,302 B2 |
| APPLICATION NO. | : 10/251323 |
| DATED | : September 20, 2002 |
| INVENTOR(S) | : Desmond J. O'Farrell, Roger L. Veldman and Kenneth Shofield |

It is certified that error appears in the above-identified patent and that said Letters Patent is hereby corrected as shown below:

Column 16:
Line 5, Claim 54, Insert --wherein-- after "claim 39,".
Line 7, Claim 45, "arm" should be --an--.

Signed and Sealed this

Sixth Day of February, 2007

JON W. DUDAS
*Director of the United States Patent and Trademark Office*

UNITED STATES PATENT AND TRADEMARK OFFICE
CERTIFICATE OF CORRECTION

PATENT NO. : 6,956,302 B2
APPLICATION NO. : 10/251323
DATED : October 18, 2005
INVENTOR(S) : Desmond J. O'Farrell, Roger L. Veldman and Kenneth Shofield It is certified that error appears in the above-identified patent and that said Letters Patent is hereby corrected as shown below:

Column 3:
Line 20, "positioninig" should be --positioning--.

Column 5:
Line 47, "drive's" should be --driver's--.

Column 6:
Line 57, "23 at" should be --28 of--.
Line 62 "23" should be --28--.

Column 8:
Line 16, "33" should be --38--.

Column 10:
Line 38, "aces" should be --axes--

Column 12:
Line 15, Claim 11, Insert --receives an input from at least-- after "control".
Line 42, Claim 18, Insert --rearview mirror assembly-- after "exterior".
Line 43, Claim 18, "minor" should be --mirror--.
Line 53, Claim 20, "minor" should be --mirror--.

Column 13:
Line 13, Claim 22, "minor" should be --mirror--.
Line 15, Claim 23, Insert --said-- after "claim 20,".
Line 37, Claim 29, Insert --wherein-- after "claim 28,".

UNITED STATES PATENT AND TRADEMARK OFFICE
CERTIFICATE OF CORRECTION

PATENT NO. : 6,956,302 B2
APPLICATION NO. : 10/251323
DATED : October 18, 2005
INVENTOR(S) : Desmond J. O'Farrell, Roger L. Veldman and Kenneth Shofield It is certified that error appears in the above-identified patent and that said Letters Patent is hereby corrected as shown below:

Column 16:
Line 5, Claim 54, Insert --wherein-- after "claim 39,".
Line 7, Claim 45, "arm" should be --an--.

This certificate supersedes Certificate of Correction issued February 6, 2007.

Signed and Sealed this

Twenty-seventh Day of February, 2007

JON W. DUDAS
*Director of the United States Patent and Trademark Office*